United States Patent [19]
Ohara

[11] Patent Number: 6,104,755
[45] Date of Patent: Aug. 15, 2000

[54] MOTION DETECTION USING FIELD-DIFFERENCE MEASUREMENTS

[75] Inventor: Kazuhiro Ohara, Richardson, Tex.

[73] Assignee: Texas Instruments Incorporated, Dallas, Tex.

[21] Appl. No.: 08/927,990

[22] Filed: Sep. 12, 1997

[51] Int. Cl.7 .............................. H04N 7/12; H04B 1/66
[52] U.S. Cl. ........................ 375/240; 348/416; 348/446
[58] Field of Search .................................. 348/416, 452, 348/451, 448, 606, 607, 620, 459, 415, 446, 445, 450, 625, 627; 375/240

[56] References Cited

U.S. PATENT DOCUMENTS

| | | | |
|---|---|---|---|
| 4,731,648 | 3/1988 | Bernard et al. | 358/105 |
| 4,768,092 | 8/1988 | Ishikawa | 358/140 |
| 4,924,305 | 5/1990 | Nakagawa et al. | 358/105 |
| 4,979,020 | 12/1990 | Isnardi | 348/433 |
| 5,134,480 | 7/1992 | Wang et al. | 348/620 |
| 5,208,667 | 5/1993 | Saunders | 348/452 |
| 5,337,154 | 8/1994 | Doricott et al. | 348/448 |
| 5,519,451 | 5/1996 | Clatanoff et al. | 348/448 |
| 5,592,231 | 1/1997 | Clatanoff et al. | 348/452 |
| 5,796,437 | 8/1998 | Muraji et al. | 348/452 |

FOREIGN PATENT DOCUMENTS

| | | |
|---|---|---|
| 0 662 767 A2 | 7/1995 | European Pat. Off. . |
| 0 688 133 A2 | 12/1995 | European Pat. Off. . |
| 0227272984 | 11/1990 | Japan . |

*Primary Examiner*—Chris S. Kelley
*Assistant Examiner*—Gims Philippe
*Attorney, Agent, or Firm*—Charles A. Brill; Wade James Brady, III; Frederick J. Telecky, Jr.

[57] ABSTRACT

A method of measuring the motion in video image data for a pixel which uses both field-difference and frame-difference motion values to generate a motion value having increased accuracy. Image data (806) from the same pixel in a prior row of the same field (906) is compared to image data (808) from the same pixel in the prior row of the prior frame (908), and the absolute value of the difference is compared to the absolute value of the difference in image data (802) from the same pixel in a following row of the same field (902) and image data (804) from the same pixel in the following line of the prior frame (904). The minimum of these two values is the minimum frame-difference motion value which is input into a logical mixer. Also input into the logical mixer is the minimum field-difference motion value which may be determined by comparing data (802, 806) from the same pixel of an adjacent line of the same field (902, 906) with image data (810) from the same pixel of the same line of the prior field. The average of image data (810) from the same pixel of the same line of the prior field and image data (812, 814) from the same pixel of two rows prior or two rows after of the prior field (912, 914) may be used instead of image data (810) from the same pixel of the same line of the prior field alone, to increase the accuracy of the measurement.

9 Claims, 5 Drawing Sheets

MOTION DETECTION USING FIELD-DIFFERENCE MEASUREMENTS

FIELD OF THE INVENTION

This invention relates to the field of image display systems, more particularly to methods and systems for detecting motion in a video data sequence.

BACKGROUND OF THE INVENTION

Video image display systems create moving images by rapidly displaying a sequence of still images, or frames. Display systems must rapidly produce each new frame in order to create the impression of smooth motion in the video sequence. Each frame is formed by displaying an orthogonal array of picture elements, or pixels. During each frame, every pixel in the array is assigned its own brightness and color value. Digital systems typically represent a single pixel using three values, each value representing the intensity of one of three component colors.

Due to the high frame rate required to smoothly portray moving objects, display systems require a very high data throughput. Early television broadcast standards, such as NTSC, developed a technique called interlacing to reduce the throughput requirements. Interlaced video systems, such as NTSC, PAL, SECAM, and some HDTV standards, transmit each frame as two sub-frames or fields. Each of the two fields that form a frame contain alternate scan lines from the frame. The first field typically contains all of the odd scan lines while the second field contains all of the even scan lines. Because the display forms the two sequential fields so quickly, the viewer's eye integrates the sequential fields into a continuous moving display. While the two separate fields are visually integrated into a single frame, flicker is reduced by projecting the image fields sequentially.

Modern image display systems, such as most computer displays and some HDTV standards, are non-interlaced. Non-interlaced video systems are typically called progressively scanned, or simply proscan, since the lines that form each image are scanned sequentially from top to bottom instead of being divided into two fields. Proscan display systems must have a higher frame rate than interlaced systems in order to avoid visible image flicker. Because of the higher frame rate, proscan systems typically display more information and have a higher resolution than comparable interlaced systems with a lower frame rate.

Some modern image display systems with relatively high bandwidths convert interlaced video signals to proscan in order to improve the display quality. Additionally, some display devices, such as the digital micromirror device (DMD), utilize proscan data conversion to compensate for a lack of image persistence.

Proscan conversion can introduce errors, or artifacts, into an image depending on what the video sequence is displaying and how the proscan conversion is being performed. A simple form of proscan conversion simply adds the even lines from a frame to the odd lines of a frame. Although this form of proscan conversion is preferred for still images, it creates problems when displaying moving objects. The problems arise from the fact that the two fields in an image frame do not represent the image at the same point in time. The image data is created by scanning the original image twice, once for every odd line and a second time for every even line, therefore the even-line field represents data one-half of a frame period later than the data represented by the odd-line field. The proscan conversion described above, which creates current frame images by filling in missing lines with pixel data from the prior field, causes misalignment in moving images. This misalignment is most obvious along the edges of a moving object since the edges will appear jagged. The same effect occurs in the center of a moving object, but unless there is a lot of contrast within the object the artifacts are not as noticeable.

Alternative forms of proscan conversion, which eliminate the effects of motion, are line doubling and line averaging. Both line doubling and line averaging use data from adjacent pixels of the same field to fill in the missing lines of the current field. Line doubling simply displays each line from the present field twice, once in its proper position and once in place of the subsequent or preceding line from the next field. When the next field is received, the display again uses each line of image data twice, once in its proper position and once in place of the preceding or subsequent line from the previous field. Line-averaging systems create a new line of image data based on the average of the image data for the lines above and below the created line. Because both the line-doubling and line-averaging methods only use data from only one time, sample, they avoid the problems associated with simply combining the two image fields. Line-doubling and line-averaging, however, reduce the effective resolution of the image since they use less information to generate each image.

In order to maintain the highest effective resolution while avoiding motion artifacts, proscan conversion systems should compensate for motion in the image data. Ideally, the contribution of adjacent pixels from the same video field and from the same pixel in adjacent video fields should depend on the amount of motion in the video sequence. Therefore an accurate motion detection system is needed to allow optimization of the proscan conversion process.

SUMMARY OF THE INVENTION

Objects and advantages will be obvious, and will in part appear hereinafter and will be accomplished by the present invention which provides an improved method and system for measuring motion in a video image and for performing a proscan conversion on interlaced video data based on the improved motion measurement.

According to a first embodiment of the improved method of measuring motion, a field-difference motion value is calculated for a missing pixel. This field-difference motion value is used to select a proscan algorithm that will accurately de-interlace the video data.

According to another embodiment of the improved method of measuring motion, a field-difference motion value is determined by calculating a first prior-field average value equal to the average of same-pixel prior-field image data and same-pixel prior-field two-rows-prior image data, and determining the absolute value of the difference between same-pixel prior-row image data and the first prior-field average value data.

According to yet another embodiment of the improved method of measuring motion, a motion value is determined by determining a first prior-field average value equal to the average of same-pixel prior-field image data and same-pixel prior-field two-rows-prior image data, determining a first field-difference motion value equal to the absolute value of the difference between same-pixel prior-row image data and the first prior-field average value data.

According to yet another embodiment of the improved method of measuring motion, a motion value is determined by determining a second prior-field average value equal to the average of same-pixel prior-field image data and same-pixel prior-field two-rows-latter image data, and determining second field-difference motion value equal to the absolute value of the difference between same-pixel prior-row image data and the second prior-field average value data.

According to yet another embodiment of the improved method of measuring motion, a first field-difference motion value is determined by determining a first prior-field average value equal to the average of same-pixel prior-field image data and same-pixel prior-field two-rows-prior image data, determining a first field-difference motion value equal to the absolute value of the difference between same-pixel prior-row image data and the first prior-field average value data, a second field-difference is determined by determining a second prior-field average value equal to the average of same-pixel prior-field image data and same-pixel prior-field two-rows-latter image data, and determining second field-difference motion value equal to the absolute value of the difference between same-pixel prior-row image data and the second prior-field average value data, and a minimum of the first and second field-difference motion values is used as the field-difference motion value.

According to yet another embodiment of the disclosed invention calculates a field-difference motion value for a missing pixel, calculates a frame-difference motion value for a missing pixel, and selects a proscan algorithm based on both the frame-difference and the field-difference motion values to select an algorithm for creating data for the missing pixel.

According to yet another embodiment of the disclosed invention, a proscan algorithm is selected based on the frame-difference motion value when the frame-difference motion value is less than a threshold and using the field-difference motion value when the frame-difference motion value is greater than the threshold.

According to yet another embodiment of the disclosed invention, a proscan algorithm is selected based on the frame-difference motion value when the frame-difference motion value is less than a first threshold, using the field-difference motion value when the frame-difference motion value is greater than a second threshold, and using a weighted average of the frame-difference and the field-difference motion values to select an algorithm for creating data for the missing pixel when the frame-difference motion value is less than the first threshold and greater than the second threshold.

According to yet another embodiment of the disclosed invention, a method of determining a motion value for a pixel location in a video signal is provided. The method comprises determining a first frame-difference motion value by comparing same-pixel prior-row image data from a current frame and a prior frame, determining a second frame-difference motion value by comparing same-pixel next-row image data from the current frame and the prior frame, and setting the motion value equal to a minimum of the first frame-difference motion value and the second frame-difference motion value.

According to yet another embodiment of the disclosed invention, a method of determining a motion value is provided. The method comprises comparing same-pixel prior-row image data from a current frame and a same-pixel same-row image data from a prior field.

According to yet another embodiment of the disclosed invention, a logical mixer is provided. The logical mixer comprises a first comparator outputting a selection signal indicating whether a first signal is greater than a threshold signal, a second comparator outputting a maximum signal equal to the maximum of the first signal and a second signal, and a selector receiving the selection signal, the first signal, and the maximum signal, the selector outputting the first signal when the first signal is less than the threshold signal and outputting the maximum signal when the first signal is greater than the threshold signal.

According to yet another embodiment of the disclosed invention, a display system is provided. The display system comprises a video processor for receiving an interlaced video signal and converting the interlaced video signal to a progressive-scan video signal, the video processor performs the conversion based on a calculated field-difference motion value for the interlaced video signal, and a display for receiving the progressive-scan video signal from the video processor and for displaying the progressive scan video signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
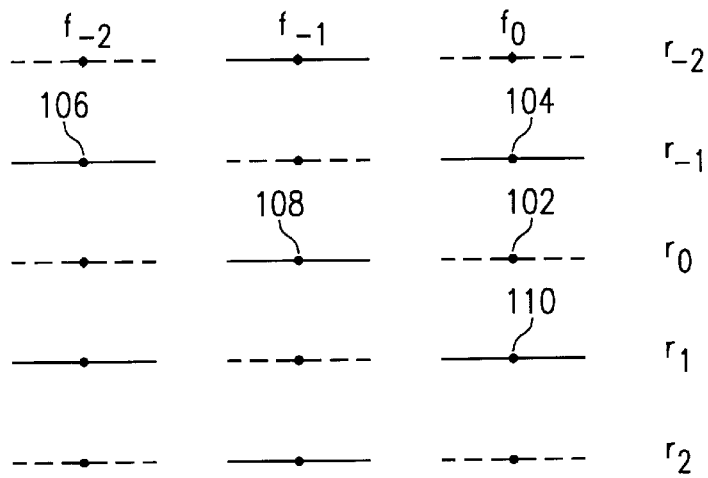
FIG. 1 is a graphical representation of five lines of image data from each of three fields of a video data sequence.

FIG. 1 schematically depicts video data for five adjacent image lines from each of three sequential fields. Each line of real image data, image data transmitted from the interleaved source, is designated by a solid line. Each line of created image data, data generated by the proscan conversion, is designated by a dashed line. The spatial relationship between image lines within a single field is shown in FIG. 1 which shows the five rows, $r_{-2}$, $r_{-1}$, $r_0$, $r_1$, and $r_2$, arranged vertically adjacent to each other. The current line, the line for which motion vectors are presently being calculated, is row $r_0$. Three sequential fields, $f_{-2}$, $f_{-1}$, and $f_0$, are shown in chronological order from left to right. The current field, the field for which motion vectors are presently being calculated, is $f_0$. As shown in FIG. 1, field $f_{-2}$ is comprised of the odd-numbered rows, $r_{-1}$ and $r_1$, of a first frame, field $f_{-1}$ is comprised of even-numbered rows $r_{-2}$, $r_0$, and $r_2$, and field $f_0$ is comprised of the odd-numbered rows, $r_{-1}$ and $r_1$, from a second frame.

The dark circle on each of the image lines represents a single pixel in the row of pixels. Unless otherwise specified, the pixel indicated in each row of a figure is the same pixel from each row, i.e. the pixel occupying the same horizontal position in each of the rows indicated.

As discussed above, non-interlaced display systems use proscan conversion to create image data for pixel 102 in row $r_0$ of field $f_0$ from data for pixels 104, 108, and 110 of an interlaced video signal. Typical motion detection algorithms subtract the pixel data of pixel 104 from the pixel data of pixel 106 and use the magnitude of the difference between the two pixels as a rough estimate of the amount of motion in the portion of the image depicted by pixel 102. If no motion is detected, the proscan conversion algorithm simply uses the data from pixel 108 for pixel 102. If a lot of motion is detected, the average of the image data from pixel 104 and pixel 110 is used for pixel 102. For intermediate motion values, a weighted average of the data from each of the three pixels is used with the weights selected to transition smoothly from the no motion use of data from pixel 108 to the high motion use of data from pixel 104 and pixel 110. For example, the image data for pixel 102, $ID_{102}$, is determined by:

$$ID_{102} = (k * ID_{108}) + (1-k)*(ID_{104} + ID_{110})/2$$

where $ID_x$ is the image data for pixel x, and k is the magnitude of the detected motion ranging from zero to one. Since there is no need to generate image data for the image lines which are transmitted in each field, the motion detection algorithm is only used on alternate lines within each field.

Figure 2:
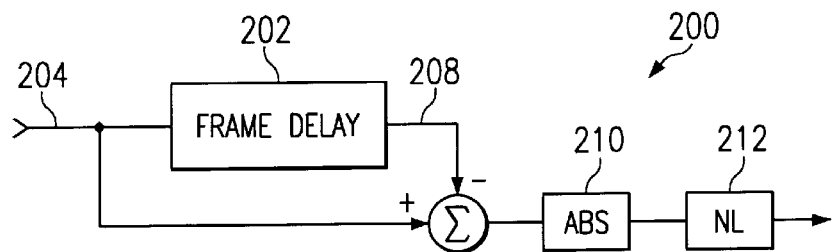
FIG. 2 is a block diagram of a frame-difference motion detection system of the prior art.

FIG. 2 is a block diagram of a motion detection system 200 according to the prior art. In FIG. 2, delay block 202 delays the current image data 204 for one frame period. Summation block 206 subtracts the delayed image data 208 from the current image data 204. The output of the summation block 206 is a number representing the detected motion at the current image pixel. Block 210 determines the absolute value of the number representing the detected motion and block 212 modifies the absolute value. Non-linear function block 212 typically subtracts a minimum threshold value from the absolute value and limits, or clips, the result to a maximum value. The minimum threshold provides some immunity to noise on the motion signal while the maximum value narrows the range of motion values that must be considered by the proscan algorithm.

In practice, the minimum threshold values determines the point at which the proscan conversion algorithm starts using current field data to generate image data, the point at which k is greater than zero in the previous equation, while the limiting value determines the point at which the proscan conversion algorithm stops using data from a previous field to generate image data, k equals 1. Therefore, the frame-difference algorithm of FIG. 2 uses current field and previous frame data to determine a motion value, k, which controls how image data is created from current field and previous field data.

Figure 3:
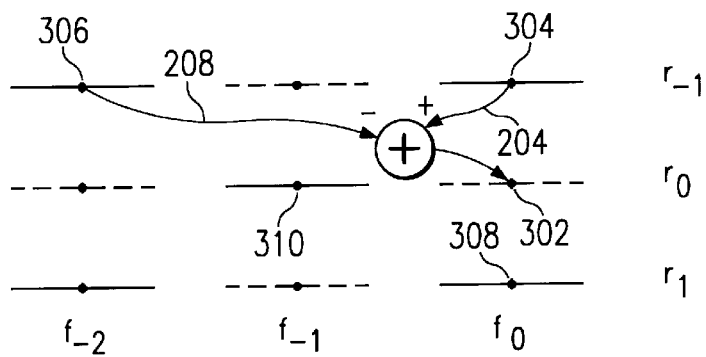
FIG. 3 is schematic representation of the frame-difference motion detection system of FIG. 2 indicating the location of the two pixels used to generate a motion value for a third pixel.

FIG. 3 depicts the operation of the frame-difference algorithm shown in FIG. 2. In FIG. 3, motion data for pixel 302 is generated by subtracting the prior frame adjacent pixel 306 ($f_2$, $r_{-1}$) data from the current frame adjacent pixel 304 ($f_0$, $r_{-1}$) data. Not shown in FIG. 3 are the absolute value or the non-linear functions of FIG. 2. Depending on the motion value determined for pixel 302, image data for pixel 302 is created using image data from pixels 304, 308, and 310.

Figure 4:
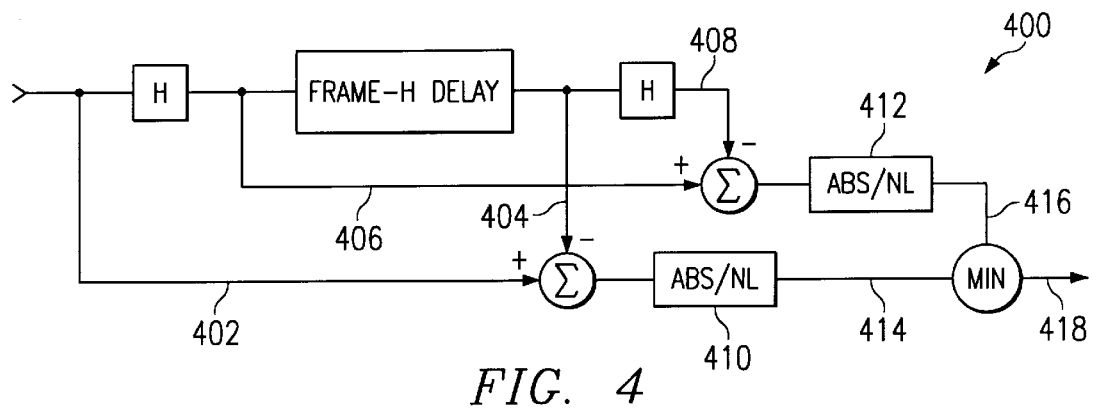
FIG. 4 is a block diagram of an improved frame-difference motion detection system which uses data from two rows of two frames to generate a motion value for a pixel.
Figure 5:
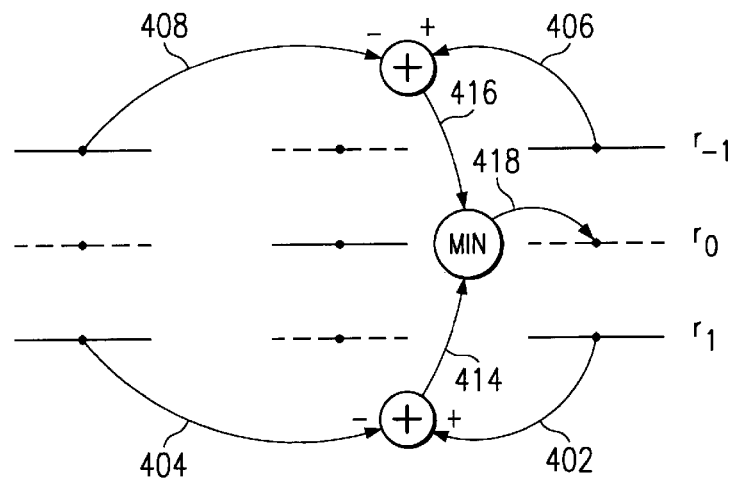
FIG. 5 is a schematic representation of the improved frame-difference motion detection system of FIG. 4 indicating the location of the four pixels used to generate a motion value for a fifth pixel.

An improved frame-difference system and algorithm, which uses data from adjacent rows above and below the missing data line is depicted in FIGS. 4 and 5. In FIGS. 4 and 5, the image data for row $r_0$ is generated using data from rows $r_{-1}$ and $r_1$. In FIG. 4, the current image data 402 is compared to image data from the previous frame 404, and image data from the previous line 406 is compared to image data from the previous line of the previous frame 408. Magnitude function blocks 410, and 412, modify the absolute value of the results of these comparisons resulting in a motion value 414 for the line below the missing line and a motion value 416 for the line above the missing line. These two motion values are compared and the minimum motion value 418 is used to influence the proscan algorithm. Instead of merely selecting the minimum motion value, the system of FIG. 4 can be modified to select the maximum motion value, or a weighted average of the two calculated motion values 414 and 416. FIG. 5 graphically shows the data flow through the system of FIG. 4. The absolute value/non-linear function blocks, 410 and 412, of FIG. 4 are not shown in FIG. 5.

The frame-difference systems and algorithms represented by FIGS. 2–5 reliably measure the image motion in still, or low-motion video sequences. They may, however, fail to detect motion in very high-motion image sequences due to the relatively slow sample rate of the input data.

Figure 6:
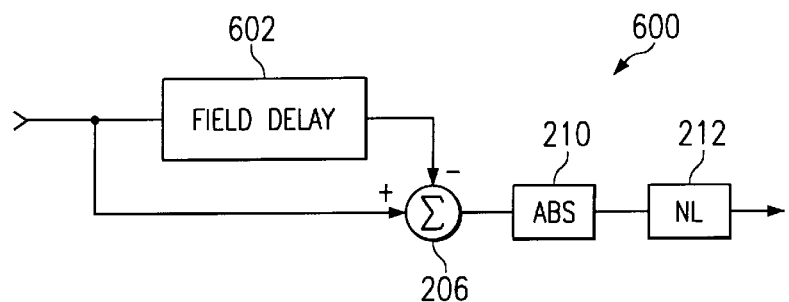
FIG. 6 is a block diagram of a field-difference motion detection system which uses same-line-previous-field data and previous-line-same-field data to generate a motion value for a pixel.
Figure 7:
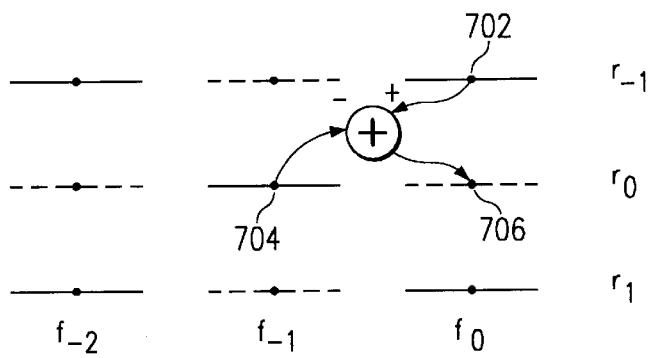
FIG. 7 is a schematic representation of the field-difference motion detection system of FIG. 6 indicating the location of the two pixels used to generate a motion value for a third pixel.

An alternative to the frame-difference systems and algorithms of FIG. 2–5 is the field-difference motion detection system 600 of FIG. 6. In FIG. 6, the frame delay of FIG. 2 has been replaced by a field delay 602. Referring to FIG. 7, the field-difference system 600 of FIG. 6 compares transmitted image data from pixels 702 ($f_0$, $r_{-1}$) and 704 ($f_{-1}$, $r_0$) to generate a detected motion value for pixel 706 ($f_0$, $r_0$). As in the frame-detection system of FIG. 2, the magnitude of the detect motion value is modified by non-linear function block 212 before it is used to control the proscan conversion algorithm.

The advantage of the field-difference motion detection system 600 of FIG. 6 is its enhanced ability to detect rapid motion compared to the detection system of FIG. 2. The enhanced detection ability is due to the increased sample rate of the field-difference motion detection system 600 compared to the frame sample rate used by the detection system 200 of FIG. 2. The field-difference motion detection system 600 uses current field ($f_0$) and previous field ($f_{-1}$) data instead of current frame and previous frame data to determine a motion value which controls how image data is created from current field and previous field data.

Unfortunately, while the field-difference motion detection system 600 detects very high rates of motion, it also generates false motion values when the processed image has a high vertical image frequency since the two data values being compared are from different rows of the image. The image data in each line in an image with a high vertical image frequency is very different from the image data in adjacent lines. Therefore, when the field-difference motion detection system 600 compares data from pixel 702 with data from pixel 704, the line-to-line difference in still image data is interpreted as motion.

Figure 8:
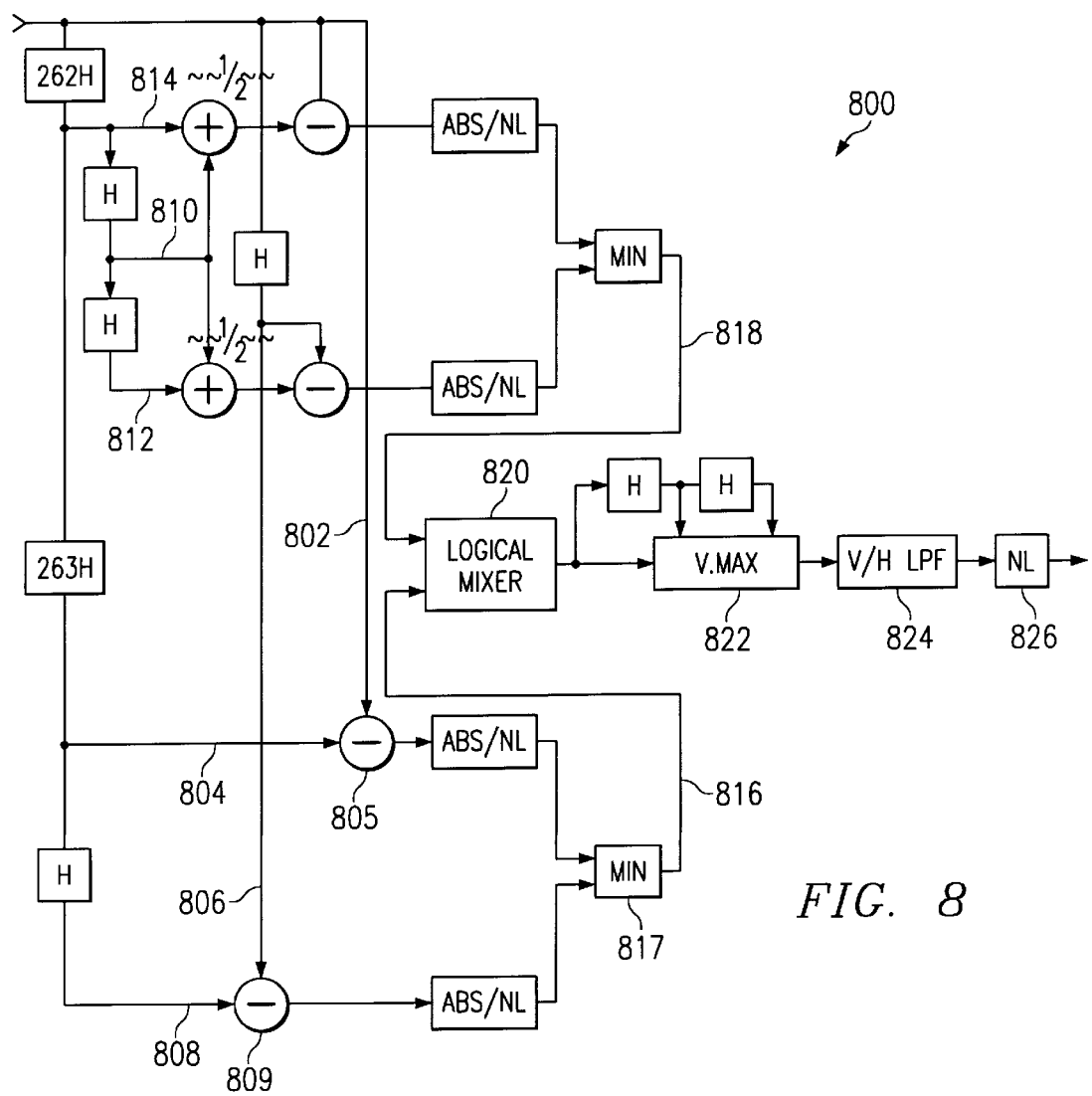
FIG. 8 is a block diagram of an improved motion detection system which uses both field and frame-difference techniques to generate a motion value for a pixel based on data from five rows and three frames of pixels.
Figure 9:
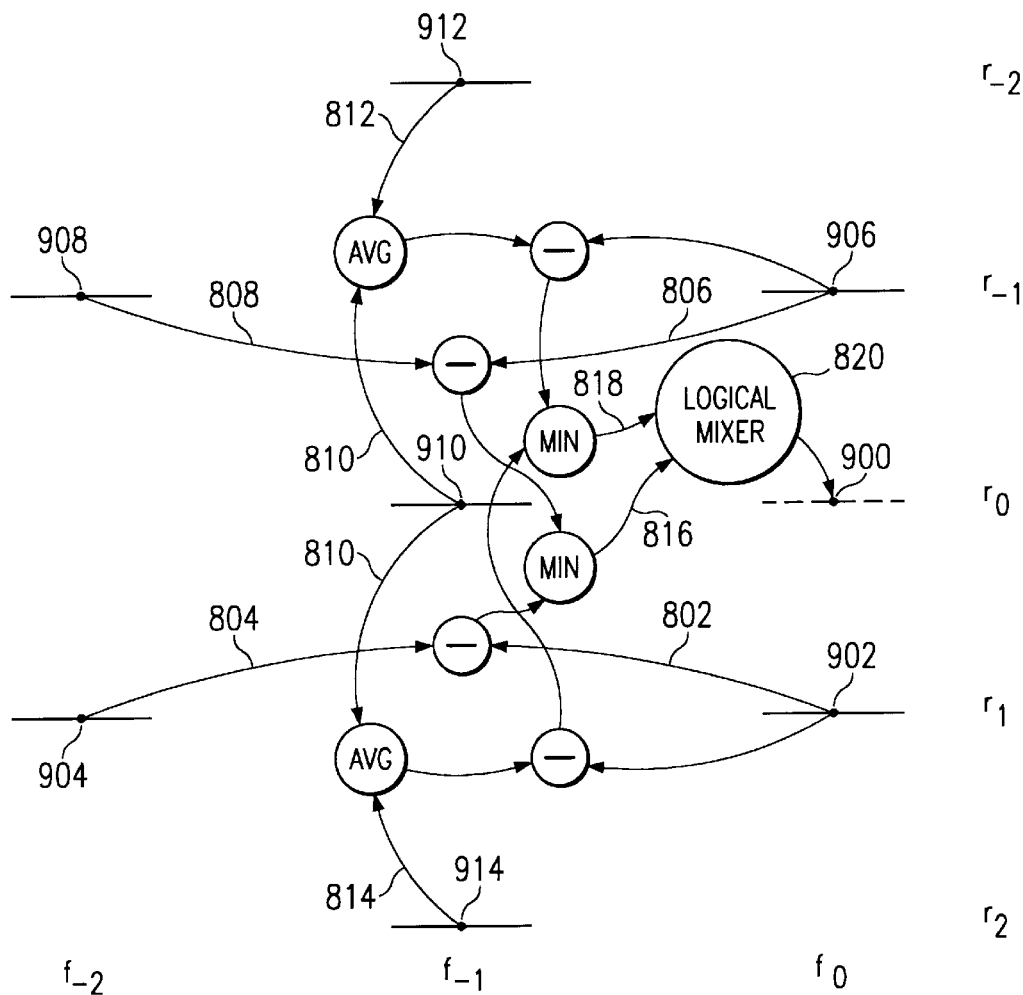
FIG. 9 is a schematic representation of the improved motion detection system of FIG. 8 indicating the location of the seven pixels used to generate a motion value for an eighth pixel.

To overcome the problems inherent with frame-difference and field-difference motion detection systems, a new detection system has been developed. The disclosed motion detection system 800 is shown in FIG. 8. FIG. 9 depicts the logical operation of the motion detection system 800 on image data. The new motion detection system of FIGS. 8 and 9 determines the motion vector for each pixel in each of the missing rows by measuring and comparing four different motion vectors. First, the system of FIGS. 8 and 9 measures the frame-difference motion vector for the same pixel, the pixel in the same horizontal location, in the lines immediately above and below the pixel of interest. Then, the system measures the field-difference motion vector for the same two pixels. The lesser of the two frame-difference motion vectors and the lessor of the two field-difference motion vectors are input into a logical mixer and used to determine the motion vector to be assigned to the current pixel.

FIGS. 8 and 9 show the steps used to calculate these four motion vectors. As shown in FIG. 8, one frame-difference motion value is computed by comparing the current image data 802 from pixel 902 ($f_0$, $r_1$) of FIG. 9 with image data 804 from the same pixel of the previous frame 904 ($f_{-2}$, $r_1$) using block 805 while the second frame-difference motion value is computed using image data 806 from the same pixel of the previous line 906 ($f_0$, $r_{-1}$) and image data 808 from the same pixel of the previous line of the previous frame 908 ($f_{-2}$, $r_{-1}$) by block 809. Comparator 817 outputs the minimum value of these two comparisons as the frame-difference motion value 816 which is equivalent to the frame-difference system 400 output of FIG. 4.

The motion detection system of FIG. 8 also calculates a minimum field-difference motion value 818 by averaging the image data from pixels 910 ($f_{-1}$, $r_0$) and 912 ($f_{-1}$, $r_{2-2}$) and comparing the average to the image data value from pixel 906 ($f_0$, $r_{-1}$). The result is compared with a second field-difference value determined using data from pixels 902 ($f_0$, $r_1$), 910 ($f_{-1}$, $r_0$), and 914 ($f_{-1}$, $r_2$), and the minimum of the two operations is the minimum field-difference value 818.

Although FIGS. 8 and 9 each show selecting the minimum field-difference motion value 818 and the minimum frame-difference motion value 816 of the two values created, the motion detection system 800 could also select the maximum motion value, the average motion value, or a weighted average of the two motion value depending on the application.

The minimum frame-difference motion value 816 and the minimum field-difference motion value 818 are both input into a logical mixer 820. The logical mixer 820 outputs a motion value which is then smoothed by an optional vertical maximum detector 822 and an optional vertical/horizontal low pass filter 824 before being modified by an optional non-linear function 826. The vertical maximum detector 822 compares the motion value of the current line with the motion value for a pixel in the same location of the previous, current, and next lines, and uses the maximum of the three values as the current pixel's motion value. The vertical maximum detector 822 and the vertical/horizontal low pass filter 824 both operate to smooth the output of the motion detection system 800. This smoothing helps to prevent visual artifacts from being introduced between regions in which motion is detected and those in which no motion is detected. Additionally, a non-linear function block 826, which typically subtracts a minimum threshold value from the motion value and limits, or clips, the result to a maximum value, also operates to smooth the motion value determined by the circuit of FIG. 8.

The disclosed motion detection circuit relies on a new logical mixer 820 to determine the proper motion value. The logical mixer 820 is critical to obtaining the accurate motion data from the field and frame-difference portions of the motion detection system 800. Because the frame-difference portion of the motion detection system 800 is very accurate for low frequency motion, the logical mixer block outputs the results of the frame-difference subcircuit when the detected motion value is low. When the detected motion value is high, however, the logical mixer block outputs the results of the field-difference subcircuit.

To summarize FIGS. 8 and 9, a motion value for the current pixel 900 is determined by first finding a field-difference motion value 818 and a frame-difference motion value 816 and inputting the field-difference motion value 818 and frame-difference motion value 816 into logical mixer 820. The frame-difference motion value is the minimum of two frame-difference motion values obtained using adjacent data from the same field ($f_0$) and the previous frame ($f_{-2}$). The first frame-difference motion value is the absolute value of the difference between image data 806 from the same pixel 906 in a prior row ($r_{-1}$) of the same field ($f_0$) and image data 808 from the same pixel 908 in the prior row ($r_{-1}$) of the prior frame ($f_{-2}$). The second frame-difference motion value is the absolute value of the difference between image data 802 from the same pixel 902 in a following row ($r_1$) of the same field ($f_0$) and image data 804 from the same pixel 904 in the following row ($r_1$) of the prior frame ($f_{-2}$). In other words, the frame-difference motion value is the minimum absolute value obtained by comparing same-pixel adjacent-row same-field image data 802, 806, with same-pixel adjacent-row prior-frame image data 804, 808.

Also input into the logical mixer is the field-difference motion value. The field-difference motion value is the minimum of two field-difference motion values obtained using adjacent data from the same field ($f_0$) and the previous field ($f_{-1}$). The first field-difference motion value is the absolute value of the difference between image data 806 from the same pixel 906 of the prior row ($r_{-1}$) of the same field ($f_0$) and the average of image data 810 from the same pixel 910 of the same row ($r_0$) of the prior field ($f_{-1}$) and image data 812 from the same pixel 912 of two rows prior ($r_{-2}$) in the prior field ($f_{-1}$). The second field-difference motion value is the absolute value of the difference between image data 802 from the same pixel 902 of the following row ($r_1$) of the same field ($f_0$) and the average of image data 810 from the same pixel 910 of the same row ($r_0$) of the prior field ($f_{-1}$) and image data 814 from the same pixel 914 of two rows following ($r_2$) in the prior field ($f_{-1}$). In other words, the field-difference motion value is the minimum absolute value obtained by comparing same-pixel adjacent-row same-field image data 802, 806, with the average of same-pixel same-row prior-field image data 810 and same-pixel two-rows-adjacent prior-field image data 812, 814. Combining the teachings of FIGS. 6 and 7 with that of FIGS. 8 and 9, image data 810 could be substituted for the average of image data 810 and the data 812, 814, from the same pixels 912, 914, two rows adjacent ($r_{-2}$, $r_2$) in the prior field ($f_{-1}$).

Figure 10:
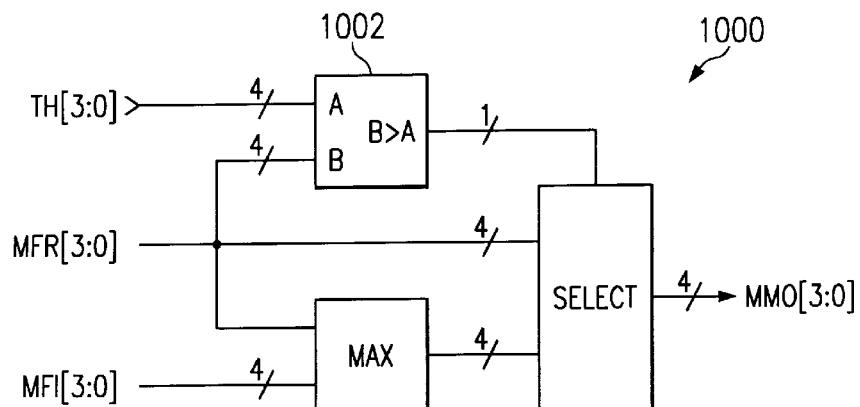
FIG. 10 is a block diagram of one embodiment of the logical mixer of FIG. 8 used to combine the results from a field-difference motion detection subsystem and a frame-difference motion detection subsystem.

FIG. 10 shows one embodiment of a logical mixer according to the present invention. In FIG. 10, the magnitude of the frame-difference motion measurement for each pixel is used as a reference by the logical mixer. The frame-difference value (MFR) is compared to a constant threshold value (TH) by comparator 1002. If the frame-difference value is greater than the threshold, the greater of the frame-difference motion value and the field-difference motion value is output by selector 1004. If the frame-difference value is less than the threshold, the frame-difference motion value is output by selector 1004. Therefore, the logical mixer 1000 of FIG. 10 selects the frame-difference motion value when there is a small motion magnitude as determined by frame-difference measurement, and the greater of the frame and field-difference motion values when the frame-difference measurement yields a large motion magnitude. The result is that the frame-difference motion value, which is very accurate, is used except when the frame-difference value is significant. This allows the faster field-difference value to be used without the fear of falsely detecting motion in still images.

Figure 11:
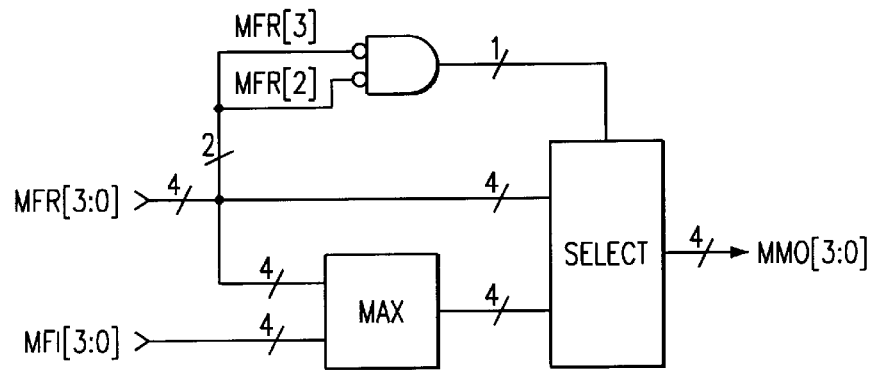
FIG. 11 is a block diagram of a second embodiment of the logical mixer of FIG. 8 used to combine the results from a field-difference motion detection subsystem and a frame-difference motion detection subsystem.

FIG. 11 shows a second embodiment of a logical mixer where the threshold value is three. In FIG. 11, whenever either one or both of the two most significant bits, MFR[3] or MFR[2], is set, the maximum of the minimum frame difference (MFR[3:0]) and minimum field difference (MFI [3:0]) motion values is used by the display system to calculate a current pixel motion value.

Figure 12:
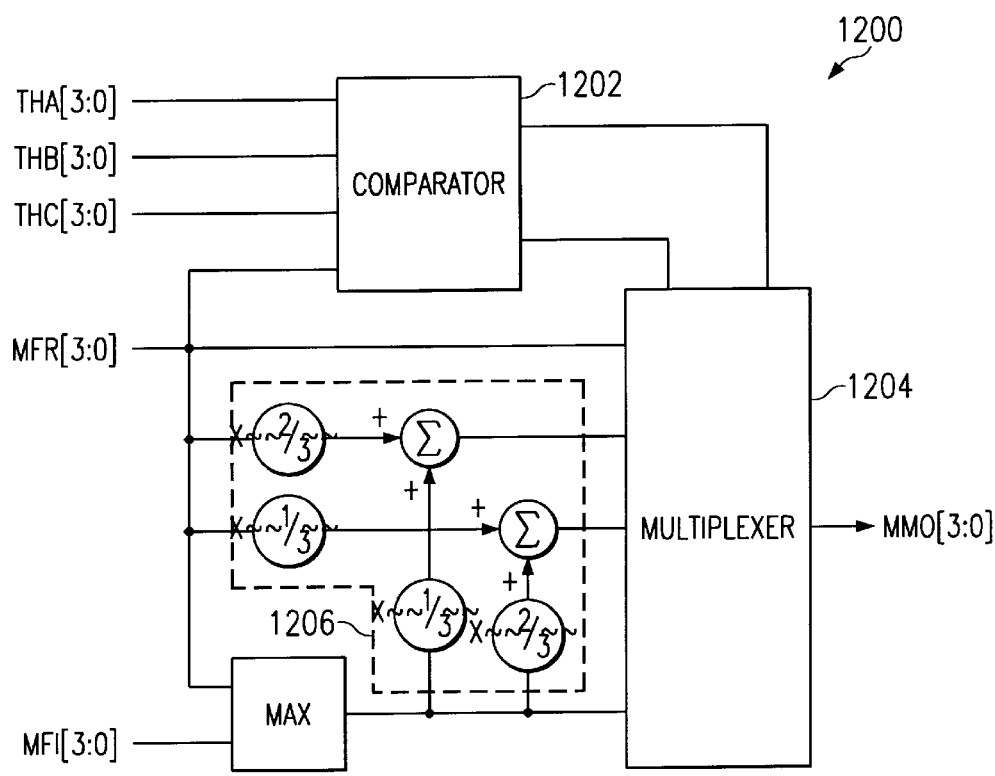
FIG. 12 is a block diagram of a third embodiment of the logical mixer of FIG. 8 that performs a soft-switching function by gradually shifting from a frame-difference output to a field-difference output.

FIG. 12 shows an embodiment of a logical mixer 1200 that implements a soft switching function. In FIG. 12, comparator 1202 compares the minimum frame difference motion value (MFR[3:0]) to a lower threshold (THA), an intermediate threshold (THB), and an upper threshold (THC), and outputs a signal to multiplexer 1204 to indicate which thresholds, if any, the minimum frame difference motion value exceeds. The minimum frame-difference motion value is output by selector 1202 whenever it is less than a lower threshold (THA), and the maximum of the field and frame-difference values is used when the minimum frame-difference motion value is above an upper threshold (THC). When the minimum frame-difference value is above the lower threshold, but below the upper threshold (THC), a weighted average of the minimum frame-difference and the minimum field-difference values, determined by averaging circuitry 1206, is used. In the example shown in FIG. 12, an intermediate threshold (THB) is used to allow one of four combinations of the frame and field-difference values to control the proscan algorithm.

Figure 13:
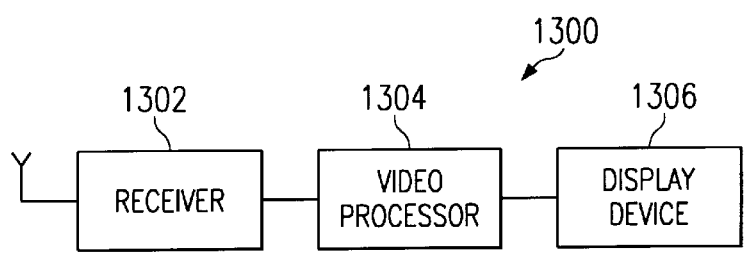
FIG. 13 is a block diagram of a display system having a video processor that uses both frame-difference and field-difference motion detection.

FIG. 13 shows one embodiment of a display system including the disclosed motion detection system. In FIG. 13, video data is received by receiver 1302. The video processor 1304 includes the disclosed motion detection system and uses the disclosed motion detection system to process the received video data. The processed video data is then output to display device 1306 for display.

Although to this point the disclosed motion detection system has been described in terms of block diagrams implementing the system, it should be understood that the system can be implemented in many ways, including hardware and software components. Table 1 below is a listing of a software program implementing the disclosed motion detection system.

TABLE 1

```
;***********************************************************************
;*                                                                      *
;*                                                                      *
;* CODE FOR MOTION DETECTION COMPARISON DEMO                            *
;*     (ONE ALGORITHM ON ONE SCREEN)                                    *
;* This code is for "Motion Detection using Field and Frame             *
;* Difference, up to Logical Mixer" algorithm                           *
;*                                                                      *
;* lib       : mac0_310.lib                                             *
;* assembler: asm_404.exe                                               *
;*                                                                      *
;* Imodes    :                                                          *
;*     Im = 1  : Motion Detection using Field/Frame Difference          *
;*     Im = 2  : Motion Detection using Field Difference                *
;*     Im = 3  : Motion Detection using Frame Difference                *
;*     Im = 4  : Pass through                                           *
;*     Im = 5  : Pass through                                           *
;*     Im = 6  : Pass through                                           *
;*    * Im = 7  : Left Output = 2, Right Output = 1                     *
;*    * Im = 8  : Left Output = 3, Right Output = 1                     *
;*    * Im = 9  : Left Output = 1, Right Output = 2                     *
;*    * Im = 10 : Left Output = 1, Right Output = 3                     *
;*    * Im = 11 : Left Output = 1, Right Output = 4                     *
;*    * Im = 12 : Left Output = 1, Right Output = 5                     *
;*    * Im = 13 : Left Output = 1, Right Output = 6                     *
;*    * Im = 14 : Left Output = 6, Right Output = 4                     *
;*    * Im = 15 : Left Output = 5, Right Output = 4                     *
;*                                                                      *
;* Imodes 7 through 15 are not available with this program.             *
;*                                                                      *
;***********************************************************************
        ERI
    .width   132
    .mlib    c:\svp\lib\mac0_310.lib
;   .mlib;   c:\lib\mac0_310.lib
```

TABLE 1-continued

```
;**************    RF Regions    *****************************************
RF0:
;---------------------
VM00        .set0   0       ; 0H delayed Logical Mixer Output
VL00        .set0   4       ; 0H delayed Vertical Max Function Output
VM01        .set0   8       ; 1H delayed Logical Mixer Output
VL01        .set0   12      ; 1H delayed Vertical Max Function Output
VM02        .set0   16      ; 2H delayed Logical Mixer Output
VL02        .set0   20      ; 2H delayed Vertical Max Function Output
VM03        .set0   24      ; 3H delayed Logical Mixer Output
VL03        .set0   28      ; 3H delayed Vertical Max Function Output
VM04        .set0   32      ; 4H delayed Logical Mixer Output
VL04        .set0   36      ; 4H delayed Vertical Max Function Output
D01         .set0   0       ; Scratch memory
D02         .set0   60      ; Scratch memory
D03         .set0   70      ; Scratch memory
L00         .set0   81      ; Scratch memory
L01         .set0   91      ; Scratch memory
F0          .set0   127     ; Scratch memory
RF1:
;---------------------
E10         .set1   0       ; 262H delayed Luminance
E11         .set1   8       ; 263H delayed Luminance
E12         .set1   16      ; 264H delayed Luminance
F10         .set1   24      ; 524H delayed Luminance
F11         .set1   32      ; 525H delayed Luminance
F12         .set1   40      ; 526H delayed Luminance
D10         .set1   48      ; Luminance
D11         .set1   56      ; 1H delayed Luminance
D12         .set1   64      ; 2H delayed Luminance
L10         .set1   72      ; Scratch memory
L11         .set1   76      ; Scratch memory
L12         .set1   80      ; Scratch memory
F1          .set1   127     ; Scratch memory
;     DOR
;---------------------
MM0         .set    8       ; Motion Magnitude Output
YO          .set    0
;     DIR
;---------------------
Y           .set    0       ; Luminance
Y262        .set    32      ; 262H delayed Luminance
Y524        .set    8       ; 524H delayed Luminance
            lrm0    40, 8
            lrm1    72, 8
;*******************    IG Code    *****************************************
;*******************    HSYNC 1    *****************************************
hsync1:jfaz  $                      ; Wait for Flag A
    mov out'MM0, R0'L00+1'4         ; output Left half Motion Magnitude
    mov out'YOUT, R0'D03'8          ; output Left half Luminance
        grl0                        ; Global Rotate RF0
        grl1                        ; Global Rotate RF1
        umr                         ; Update Mode Resister
        mov R1'D10, inp'Y'8         ; input Luminance
        mov R1'E10, inp'Y262'8      ; input 262H delayed Luminance
        mov R1'F10, inp'Y524'8      ; input 524H delayed Luminance
;       jme   lum, 2
        mov   R0'D03, R1'D12'8 ; D03 = 2H delayed Luminance
;       jmp   next
;       lum:  mov R0'D03, R1'D10'8
                                    ; Pass Through Mode
next:   jme    hsync1, 4            ; if Imode = 4, then jump to hsync1
        jme    hsync1, 5            ; if Imode = 5, then jump to hsync1
        jme    hsync1, 6            ; if Imode = 6, then jump to hsync1
        mov    R0'L00, R1'F11'8     ; L00 = 525H delayed Luminance
        mov    R0'L01, R1'F12'8     ; L01 = 526H delayed Luminance
        mov    R0'D01, R1'E11'8     ; D01 = 263H delayed Luminance
        mov    R0'D02, R1'E12'8     ; D01 = 264H delayed Luminance
                                    ; Motion Detection using Field Difference
        jme    mfi, 2               ; if Imode = 2, then jump to MFI
;*******************    MFR              *****************************************
;*******************    Frame Difference 1    *********************************
;*******************    Subtraction 1         *********************************
;*                                                                            *
;* Subtract from Previous Frame                                               *
;* ( 525H delayed Luminance - Luminance )                                     *
;*                                                                            *
;******************************************************************************
mfr:   sub    R0'L00, R0'L00'8, R1'D10'8, 0
```

TABLE 1-continued

```
                                    ; L00 = 525H delayed Luma - Luma
;****************    Absolute/Non-Linear Function 1    **********************
;*                                                                          *
;* Absolute Previous result, and add -4                                     *
;*  ( ABS(L00) + (-4) )                                                     *
;*                                                                          *
;***************************************************************************
     abs    R0'L00, R0'L00'9, 1 ;L00 = ABS(L00)
     addc   R0'L00, -4'4, R0'L00'9, 1
                                    ; L00 = L00 + (-4)
     clpzt  R0'L00'4, R0'L00'10, R1'F1
                                    ; Clip L00(11 bits) to (4 bits) and save
;****************    Frame Difference 2    *********************************
;****************    Subtraction 2         *********************************
;*                                                                          *
;* Subtract from 1H delayed Previous Frame                                  *
;*  ( 526H delayed Luminance - 1H delayed Luminance)                        *
;*                                                                          *
;***************************************************************************
     sub    R0'L01, R0'L01'8, R1'D11'8, 0
                                    ; L01 = 526H delayed Luma - 1H delayed Luma
;****************    Absolute/Non-Linear Function 2    **********************
;*                                                                          *
;* Absolute Previous result, and add -4                                     *
;*  ( ABS(L01) + (-4) )                                                     *
;*                                                                          *
;***************************************************************************
     abs    R0'L01, R0'L01'9, 1 ; L01 = ABS(L01)
     addc   R0'L01, -4'4, R0'L01'9, 17
                                    ; L01 = L01 +(-4)
     clpzt  R1'L11'4, R0'L01'10, R1'F1
                                    ; Clip L01(11 bits) to (4 bits)
                                    ;     and save to L11
;****************    Min Function for MFR    *******************************
;*                                                                          *
;* Take the smaller of Frame Difference 1 and 2                             *
;*  ( MIN(L00,L11) )                                                        *
;*                                                                          *
;***************************************************************************
     min    R0'L00, R0'L00, R1'L11'4, R0'F0, 0
                                    ; L00 = MIN(L00, L11)
                                    ; Motion Detection using Frame Difference
     jme    move, 3                 ; if Imode=3, then jump to MOVE
;*****************    MFI    ************************************************
;****************     Field Difference 1   **********************************
;****************     Line Average 1       **********************************
;*                                                                          *
;* Take line average of 262H delayed Luminance and 263H delayed             *
;* Luminance, and subtract from present Field Luminance                     *
;*  ( Luminance - 1/2 * (262H delayed Luma + 263H delayed Luma) )           *
;*                                                                          *
;***************************************************************************
mfi: add    R0'D01, R0'D01'8, R1'E10'8, 0
                                    ; D01 = 262H delayed Luma + 263H delayed Luma
                                    ; D01 = (1/2) * D01
     sub    R0'D01+1, R1'D10'8, R0'D01+1'8, 0
                                    ; D01 = (1/2)*D01 - Luminance
;****************    Absolute/Non-linear Function 1    **********************
;*                                                                          *
;* Absolute Previous result, and add -4                                     *
;*  ( ABS(D01) + (-4) )                                                     *
;*                                                                          *
;***************************************************************************
     abs    R0'D01+1, R0'D01+1'9, 0; D01 = ABS(D01)
     addc   R0'D01+1,-4'4, R0'D01+1'8, 1
                                    ; D01 = D01 + (-4)
     clpzt  R0'D01+1'4, R0'D01+1'9, R1'F1
                                    ; Clip D01(11 bits) to (4 bits) and save
;****************    Field Difference 2    *********************************
;**************** Line Average 2           *********************************
;*                                                                          *
;* Take line average of 263H delayed Luminance 264H delayed                 *
;* Luminance, and subtract from 1H delayed Field Luminance                  *
;*  ( 1H delayed Luminance -                                                *
;*       (263H delayed Luma + 264H delayed Luma)                            *
;*                                                                          *
;***************************************************************************
     add    R0'D02, R0'D02'8, R1'E11'8, 0
                                    ; D02 = 263H delayed Luma + 264H delayed Luma
```

TABLE 1-continued

```
                        ; D02 = (1/2) * D02
    sub    R0'D02+1, R1'D11'8, R0'D02+1'8, 0
                        D02 = (1/2) * D02 - 1H delayed Luma
;****************   Absolute/Non-linear Function 2   ************************
;*                                                                          *
;* Absolute Previous result, and add −4                                     *
;*   ( ABS(D02) + (−4) )                                                    *
;*                                                                          *
;****************************************************************************
    abs    R0'D02+1, R0'D02+1'9, 0; D02 = ABS(D02) extending 1 bit
    addc   R0'D02+1, −4'4, R0'D02+1'8, 1
                        ; D01 = D01 + (−4)
    clpzt  R1'L12'4, R0'D02+1'9, 1'F1
                        ; Clip D02(11 bits) to (4 bits)
                        ;     and save to L12
;****************   Min Function for MFI   *********************************
;*                                                                          *
;* Take the smaller of Field Difference 1 and 2                             *
;*   ( MIN(D01+1, L12) )                                                    *
;*                                                                          *
;****************************************************************************
    min    R1'L12, R1'L12, R0'D01+1'4, R1'F1, 0
                        ; L12 = MIN(L12, D01)
                        ; Motion Detection using Field Difference
    jme    max3, 2      ; if Imode = 2, then jump to MAX3
;****************   Logical Mixer   ****************************************
lmix: mov  R1'L10, R0'L00'4   ; L10 = MFR
;****************   Create Select Signal   *********************************
;*                                                                          *
;* By taking NOR of MSB and 2nd MSB, create Select Signal                   *
;*   ( NOR(MSB of MFR, 2nd MSB of MFR) )                                    *
;*                                                                          *
;****************************************************************************
    or     R1'L10+3, R1'L10+3, R0'L00+2'1
                        ; L10+3 = OR(MSB of MFR, 2nd MSB of MFR)
    not    R1'L10+3, R1'L10+3'1 ; L10+3 = NOT(L10+3)
;****************   Max Function   *****************************************
;*                                                                          *
;* Take max of MFR and MFI                                                  *
;*   ( MAX (MFR, MFI) )                                                     *
;*                                                                          *
;****************************************************************************
    max    R1'L12, R1'L12, R0'L00'4, R1'F1, 0
                        ; L12 = Max(MFR, MFI)
;****************   Selector   *********************************************
;*                                                                          *
;* Select MFR or Max of MFR and MFI, depending on Select Signal             *
;*                                                                          *
;****************************************************************************
    kmov   R1'L12, R0'L00'4, R1'L10+3
                        ; Select : if L10+3 = 1, L12 = L00(MFR)
                        ; if L10+3 = 0, L12 = L12
    jmp    max3         ;     Jump to MAX3
;****************   3 Line Max Function   **********************************
move:     mov   R1'L12, R0'L00'4   ; L12 = L00 = MFR Min Function Output
max3:     mov   R0'VM00, R1'L12'4 ; VM00 = L12 = Logical Mixer Output(LMO)
          max   R1'L12, R1'L12, R0'VM01'4, R0'F0, 0
                        ; L12 = MAX(VM00, 1H delayed LMO)
          max   R1'L12, R1'L12, R0'VM02'4, R0'F0, 0
                        ; L12 = MAX(L12, 2H delayed LMO)
;****************   5 Line Vertical Max Function   *************************
;   max    R1'L12, R1'L12, R0'VM03'4, R0'F0, 0
                        ; L12 = MAX(L12, 3H delayed LMO)
;   max    R1'L12, R1'L12, R0'VM04'4, R0'F0, 0
                        ; L12 = MAX(L12, 4H delayed LMO)
;****************   Vertical Low Pass Filter   *****************************
;*                                                                          *
;* 1/4 T^−2 + 1/2 T^−1 + 1/2 + 1/2 T^1 + 1/4 T^2                            *
;*                                                                          *
;****************************************************************************
    mov    R0'VL00, R1'L12'4 ; VL00 = L12
    add    R1'L12, R1'L12'4, R0'VL04'4, 0
                        ; L12 = VL00 + 4H delayed VL00
                        ; L12 = 1/2 * L12
    add    R1'L12+1, R1'L12+1'4, R0'VL01'4, 0
                        ; L12 = L12 + 1H delayed VL00
    add    R1'L12+1, R1'L12+1'5, R0'VL02'4, 0
                        ; L12 = L12 + 2H delayed VL00
    add    R1'L12+1, R1'L12+1'6, R0'VL03'4, 0
```

TABLE 1-continued

```
                    ; L12 = L12 + 3H delayed VL00
;******************   Horizontal Low Pass Filter   *****************************
;*                                                                             *
;* H(z) = (z^-1 + z^1)(z^-2 + z^2)(z^-1 + 1)(z^1 + 1) * 1/8                    *
;*                                                                             *
;******************************************************************************
    add    R0'L00-3, LR1'L12+2'6, RR1'L12+2'6, 0
                    ; L00 = Left(L12) + Right(L12)
    add    R0'L00-3, L2R0'L00-3'7, R2R0'L00-3'7, 0
                    ; L00 = 2Left(L00) + 2Right(L00)
    add    R0'L00-3, LR0'L00-3'8, R0'L00-3'8, 0
                    ; L00 = Left(L00) + L00
    add    R0'L00-3, RR0'L00-3,9, R0'L00-3'9, 0
                    ; L00 = Right(L00) + L00
;******************   Non-linear Function   *************************************
;*                                                                             *
;* add -2 to previous result and devide by 2                                   *
;*                                                                             *
;******************************************************************************
    set    R0'L00+7, 0, 1          ; sign L00
    addc   R0'L00, -2,3, R0'L00'8, 1
                    ; L00 = L00 + (-2)
                    ; L00 = 1/2 * L00
    clpzt  R0'L00+1'4, R0'L00+1'8, R1'F1
                    ; Clip L00(8 bits) to (4 bits) and save
    jmp    hsync1   ; Jump and wait for hsync1
    .end
;******************   EOF   ****************************************************
```

Thus, although there has been disclosed to this point a particular embodiment for a motion detection system and a method thereof, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, for example, later data fields, if available, could also be used to determine the motion of the image data, it is intended to cover all such modifications as fall within the scope of the appended claims.

What is claimed is:

1. A method of converting interlaced video data to progressive scanned data said method comprising:
   receiving a series of fields of said interlaced video data;
   calculating a field-difference motion value for a missing pixel by:
      determining a prior-field average value equal to the average of same-pixel same-row prior-field image data and same-pixel two-rows-adjacent prior-field image data of said received interlaced video data; and
      determining the absolute value of the difference between same-pixel adjacent-row same-field image data and said prior-field average value data of said received interlaced video data; and
   selecting a proscan algorithm based on said field-difference motion value.

2. A method of converting interlaced video data to progressive scanned data, said method comprising:
   receiving a series of fields of said interlaced video data;
   calculating a field-difference motion value for a missing pixel of said received interlaced video data by:
      calculating a first field-difference motion value for a missing pixel;
      calculating a second field-difference motion value for a pixel one row prior to said missing pixel;
      calculating a third field-difference motion value for a pixel one row after said missing pixel; and
      selecting a maximum of said first, second, and third field difference motion values as said field-difference motion value for said missing pixel; and
   selecting a proscan algorithm based on said field-difference motion value.

3. A method of converting interlaced video data to progressive scanned data, said method comprising:
   receiving a series of fields of said interlaced video data,
   calculating a field-difference motion value for a missing pixel in said received interlaced video data by:
      determining a first prior-field average value equal to the average of same-pixel same-row prior-field image data and same-pixel prior-field two-rows-prior image data of said received interlaced video data; and
      determining a first field-difference motion value equal to the absolute value of the difference between same-pixel prior-row same-field image data of said received interlaced video data and said first prior-field average value data;
      determining a second prior-field average value equal to the average of same-pixel same-row prior-field image data and same-pixel prior-field two-rows-latter image data of said received interlaced video data; and
      determining second field-difference motion value equal to the absolute value of the difference between same-pixel prior-row same-field image data of said received interlaced video data and said second prior-field average value data; and
   selecting a proscan algorithm based on said field-difference motion value.

4. The method of claim 3, further comprising the step of:
   selecting a minimum of said first and second field-difference motion values as said field-difference motion value.

5. A method of converting interlaced video data to progressive scanned video data, said method comprising:

calculating a field-difference motion value for a missing pixel;

calculating a frame-difference motion value for a missing pixel; and selecting a proscan algorithm for creating data for said missing pixel both on said frame-difference and said field-difference motion values;

comparing the frame-difference motion value to a first threshold; said selecting a proscan algorithm step comprising the step of using the frame-difference motion value to select an algorithm for creating data for said missing pixel when the frame-difference motion value is less than the first threshold and using a maximum of the field-difference motion value and the frame difference motion value to select an algorithm for creating data for said missing pixel when the frame-difference motion value is greater than the first threshold.

6. A method of converting interlaced video data to progressive scanned data, said method comprising:

calculating a field-difference motion value for a missing pixel;

calculating a frame-difference motion value for a missing pixel; and selecting a proscan algorithm for creating data for said missing pixel both on said frame-difference and said field-difference motion values;

comparing said frame-difference motion value to a first threshold;

comparing said frame-difference motion value to a second threshold;

said selecting a proscan algorithm based on the field-difference motion value step further comprising:

using said frame-difference motion value to select an algorithm for creating data for the missing pixel when the frame-difference motion value is less than the first threshold;

using a maximum of said field-difference motion value and said frame-difference motion value to select an algorithm for creating data for said missing pixel when said frame-difference motion value is greater than the second threshold;

using a weighted average of said frame-difference and field-difference motion values to select an algorithm for creating data for said missing pixel when said frame-difference motion value is less than the first threshold and greater than said second threshold.

7. A method of determining a motion value for a pixel location in a video signal, said method comprising:

determining a first frame-difference motion value by comparing same-pixel prior-row image data from a current frame and a prior frame;

determining a second frame-difference motion value by comparing same-pixel next-row image data from said current frame and said prior frame; and setting said motion value equal to a minimum of said first frame-difference motion value and said second frame-difference motion value.

8. A display system comprising:

a video processor for receiving an interlaced video signal, calculating a field-difference motion value using said received interlaced video signal, and converting said interlaced video signal to a progressive-scan video signal using an algorithm selected by said calculated field-difference motion value said video processor performing said conversion based on a pixel motion value for said interlaced video signal, said pixel motion value calculated by determining a first frame-difference motion value by comparing same-pixel prior-row image data from a current frame and a prior frame, determining a second frame-difference motion value by comparing same-pixel next-row image data from said current frame and said prior frame, selecting a minimum frame-difference motion value from said first frame-difference motion value and said second frame-difference motion value, determining a first prior-field average value by averaging same-pixel same-row image data image data from the prior field and same-pixel two-rows-before from the prior field, determining a second prior-field average value by averaging same-pixel same-row image data image data from the prior field and same-pixel two-rows-after from the prior field, determining a first field-difference motion value by comparing same-pixel prior-row image data from said current frame with said first prior-field average value, determining a second field-difference motion value by comparing same-pixel next-row image data from said current frame with said second prior-field average value, selecting a minimum field-difference motion value from said first field-difference motion value and said second field-difference motion value, selecting a maximum motion value equal to the greater of said frame-difference motion value and said field-difference motion value, providing a first threshold motion value, providing a second threshold motion value, and computing said motion value for said pixel location equal to said minimum frame-difference motion value when said minimum frame-difference motion value is less than said first threshold motion value, said pixel motion value for said pixel location equal to said maximum motion value when said minimum frame-difference motion value is greater than said second threshold motion value; and a display for receiving said progressive-scan video signal from said video processor and for displaying said progressive scan video signal.

9. The display system of claim 8, wherein said first threshold motion value equals said second threshold motion value.

* * * * *

UNITED STATES PATENT AND TRADEMARK OFFICE
CERTIFICATE OF CORRECTION

PATENT NO.     : 6,104,755
DATED          : August 15, 2000
INVENTOR(S)    : Kazuhiro Ohara It is certified that error appears in the above-identified patent and that said Letters Patent is hereby corrected as shown below:

<u>Title page,</u>
Insert Item [60], Related U.S. Application Data, -- Provisional Application No. 60/026,026 Sep. 13, 1996. --

Signed and Sealed this

Eighteenth Day of February, 2003

JAMES E. ROGAN
*Director of the United States Patent and Trademark Office*